US009220239B2

(12) United States Patent
Lamprey, Jr.

(10) Patent No.: US 9,220,239 B2
(45) Date of Patent: Dec. 29, 2015

(54) NOISE MAKING TOY HAVING SEPARABLE AND SELF-REATTACHING MEMBERS

(71) Applicant: Charles W. Lamprey, Jr., San Jose, CA (US)

(72) Inventor: Charles W. Lamprey, Jr., San Jose, CA (US)

( * ) Notice: Subject to any disclaimer, the term of this patent is extended or adjusted under 35 U.S.C. 154(b) by 89 days.

(21) Appl. No.: 14/179,460

(22) Filed: Feb. 12, 2014

(65) Prior Publication Data

US 2014/0230751 A1 Aug. 21, 2014

Related U.S. Application Data

(60) Provisional application No. 61/766,101, filed on Feb. 18, 2013.

(51) Int. Cl.
  *A01K 29/00* (2006.01)
  *A01K 15/02* (2006.01)

(52) U.S. Cl.
  CPC .................................. *A01K 15/025* (2013.01)

(58) Field of Classification Search
  CPC ..... A01K 29/00; A01K 29/005; A01K 15/00; A01K 15/02; A01K 15/025; A01K 15/026
  USPC ............ 119/702, 707–711; 446/85, 102, 105, 446/108, 124, 383, 486; 473/575, 576, 596, 473/597, 614, 612
  See application file for complete search history.

(56) References Cited

U.S. PATENT DOCUMENTS

| | | | |
|---|---|---|---|
| 2,717,437 A | 9/1955 | de Mestral | |
| 2,959,354 A * | 11/1960 | Beck | 239/36 |
| 3,778,870 A | 12/1973 | Bennett | |
| 4,208,832 A | 6/1980 | Corriveau | |
| 4,884,807 A * | 12/1989 | Welch | 473/575 |
| 5,191,856 A * | 3/1993 | Gordon | 119/711 |
| 5,551,687 A * | 9/1996 | Krull | 473/573 |
| 5,788,554 A | 8/1998 | Goodwin et al. | |
| 5,964,634 A * | 10/1999 | Chang | 446/85 |
| 6,216,640 B1 * | 4/2001 | Zelinger | 119/707 |
| 6,405,681 B1 * | 6/2002 | Ward | 119/707 |
| 8,276,547 B2 * | 10/2012 | Markham | 119/709 |
| 8,413,612 B2 * | 4/2013 | Smith | 119/709 |
| 8,464,665 B1 * | 6/2013 | Scheffler et al. | 119/709 |

* cited by examiner

*Primary Examiner* — Richard Price, Jr.
(74) *Attorney, Agent, or Firm* — Kali Law Group P.C.

(57) ABSTRACT

Noise making toy are presented including: a first graspable body element; a first releasable surface affixed along a first graspable body element surface of the first graspable body element; a second graspable body element; a second releasable surface affixed along a second graspable body element surface of the second graspable body element, where the second releasable surface is configured and positioned for releasably engaging the first releasable surface; an enclosure for enclosing the first graspable body element and the second graspable body element; and a return element affixed to the first graspable body element and the second graspable body element, where the return element is positioned along the first releasable surface and the second releasable surface, and where the return element is further positioned along an axis of pull centered along the first graspable body element and the second graspable body element.

18 Claims, 19 Drawing Sheets

ENGAGED POSITION

SEPARATED POSITION

NOISE MAKING TOY HAVING SEPARABLE AND SELF-REATTACHING MEMBERS

BACKGROUND

The predatory instinct inherent to domestic canines may cause individuals of the species to attempt to inappropriately rend and dismember non-toy items such as pillows, shoes and fabrics.

Some plush toys intended for dogs are designed to frustrate their dismemberment drive by manufacturing the toys with a sealed outer layer of durable material such as ballistic nylon or Kevlar. This type of toy may not be as desirable to some dogs, as the toy does not exhibit a ripping feel or sound when pulled.

Alternatively, less durable dog toys encourage rending and dismemberment behavior by providing a weak construction method or materials, allowing for the ready destruction of the toy. This type of toy, by design, typically does not last long, and needs to be replaced as the toy is destroyed, thus imposing a recurring replacement cost to the dog owner.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Noise making to are presented including: a first graspable body element a first releasable surface affixed along a first graspable body element surface of the first graspable body element; a second graspable body element; a second releasable surface affixed along a second graspable body element surface of the second graspable body element, where the second releasable surface is configured and positioned for releasable engaging the first releasable surface; an enclosure for enclosing the first graspable body element and the second graspable body element; and a return element affixed to the first graspable body element and the second graspable body element, where the return element is positioned along the first releasable surface and the second releasable surface, and where the return element is further positioned along an axis of pull centered along the first graspable body element and the second graspable body element. In some embodiments, noise making toys further include: a first graspable body element pull positioned opposite the first releasable surface along the first graspable body element surface; and a second graspable body element pull positioned opposite the second releasable surface along the first graspable body element surface, where the enclosure includes at least one pull opening each for the first graspable body element pull and the second graspable body element pull, and where the return element is further positioned along the axis of pull defined by the first graspable body element and the second graspable body element. In some embodiments, noise making toys further include: a first pull tab mechanically coupled along the first graspable both element surface and positioned opposite the first releasable surface; where the first pull tab is configured to receive the first graspable body element; and a second pull tab mechanically coupled along the second graspable body element surface and positioned opposite the second releasable surface, where the second pull tab is configured to receive the second graspable body element. In some embodiments, noise making toys further include: a number of travel limiting members disposed along the first and second graspable body elements and configured to limit separation between the first and second graspable body elements along the pull axis. In some embodiments, noise making toys further include: a squeaker element disposed between the first and second releasable surfaces, where the squeaker element is configured to emit a sound the first and second releasable surfaces release. In some embodiments, noise making toys further include: a squeaker element disposed between the first and second releasable surfaces, where the squeaker element is configured to emit a sound the first and second releasable surfaces engage.

In other embodiments, noise making toys are presented including: a first graspable body element; a first releasable surface affixed along a first graspable body element surface of the first graspable body element; a second graspable body element a second releasable surface affixed along a second graspable body element surface of the second graspable body element, where the second releasable surface is configured and positioned for releasable engaging the first releasable surface; an enclosure for enclosing the first graspable body element and the second graspable body element; and a number of return elements disposed along the first graspable body element and the second graspable body element, where the number of return elements are positioned along a first edge of the first releasable surface and a second edge of the second releasable surface.

In other embodiments, noise making toys are presented including: a first graspable body element; a first releasable surface affixed along a first graspable body element surface of the first graspable body element; a second graspable body element; a second releasable surface affixed along a second graspable body element surface of the second graspable body element, where the second releasable surface is configured and positioned for releasable engaging the first releasable surface; a stretchable enclosure for enclosing the first graspable body element, the second graspable body element, and the stretchable enclosure, where the stretchable enclosure is configured for returning the first graspable body element and the second graspable body element to an engaged position; and an enclosure for enclosing the first graspable body element, the second graspable body element, and the stretchable enclosure. In some embodiments, the first graspable body element further includes a first number of graspable members, and where the second graspable body element further includes a second number of graspable members such that pulling between the first number of graspable members and the second number of graspable members provides one of a tension release, a shear release, or a peel release between the first releasable surface and the second releasable surface.

Methods for using a noise making toy are presented including: providing the noise making toy, where the noise making toy includes, a first graspable body element, a first releasable surface affixed along a first graspable body element surface of the first graspable body element, a second graspable body element, a second releasable surface affixed along a second graspable body element surface of the second graspable body element, where the second releasable surface is configured and positioned for releasable engaging the first releasable surface, an enclosure for enclosing the first graspable body element and the second graspable body element, and a return element affixed to the first graspable body element and the second graspable body element, where the return element is positioned along the first releasable surface and the second releasable surface, and where the return element is further positioned along an axis of pull centered along the first graspable body element and the second graspable body element;

grasping each of the first and second graspable body elements; pulling each of the first and the second graspable body elements apart along the axis of pull where a noise is emitted when the first and second releasable surfaces are at least partially separated; and releasing at least one of the first and second graspable body elements such that the first and second releasable surfaces are reengaged. In some embodiments, methods further include: grasping a first graspable body element pull positioned opposite the first releasable surface along the first graspable body element surface; grasping a second graspable body element pull positioned opposite the second releasable surface along the first graspable body element surface; and pulling the first and second graspable body elements apart along the axis of pull, where the enclosure includes at least one pull opening each for the first graspable body element pull and the second graspable body element pull, and where the return element is further positioned along the axis of pull defined by the first graspable body element and the second graspable body element.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
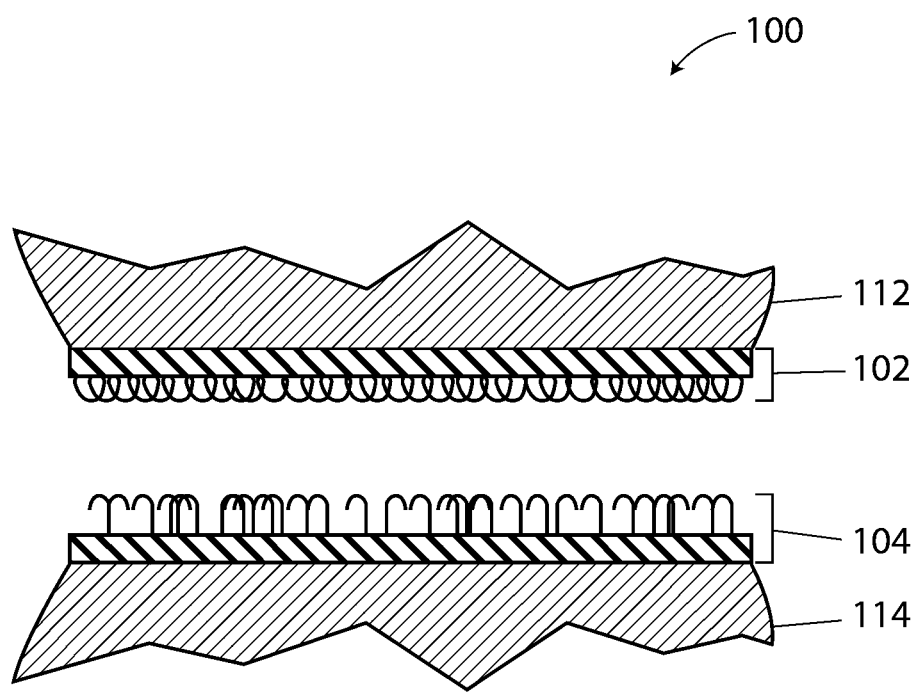
FIG. 1 is a prior art illustrative representation of hook and loop surfaces.

FIG. 1 is a prior art illustrative representation 100 of hook and loop surfaces. In particular, a complementary pair of hook 102 and loop 104 surfaces may each be adjoined with body elements 112 and 114 respectively. Hook and loop surfaces may be affixed with body elements in any manner known in the art. Hook and loop surfaces operate by overlaying a pair of complementary surfaces and then applying compression to the surfaces.

Releasable surfaces may be generally classified as being of one of two types, based upon their surfacing:

Type one—Also known as hook and loop, this releasable surface system utilizes an overlay of "male" surfacing with "female" surfacing to create a bond. Most commercially available releasable surfaces are of this type. This category is commonly referred to by the trade name VELCRO™ such as illustrated in FIG. 1.

Type two—this releasable surface system utilizes an overlay of "hermaphroditic" surfaces to create a bond. One such example of this type of hermaphroditic surfacing is "mushroom" shaped surfacing, such as found in 3M™ DUAL LOCK™. When the two hermaphroditic surfaces are overlaid and a compressive force is applied, a number of surface protrusions from each surfacing adjoin to create a separable and releasable bond.

In embodiments provided herein, releasable surfaces may be made of materials such as: nylon, polyester, polypropylene, polyethylene, polyphenylene sulfide and polyvinylchloride without limitation.

Figure 2:
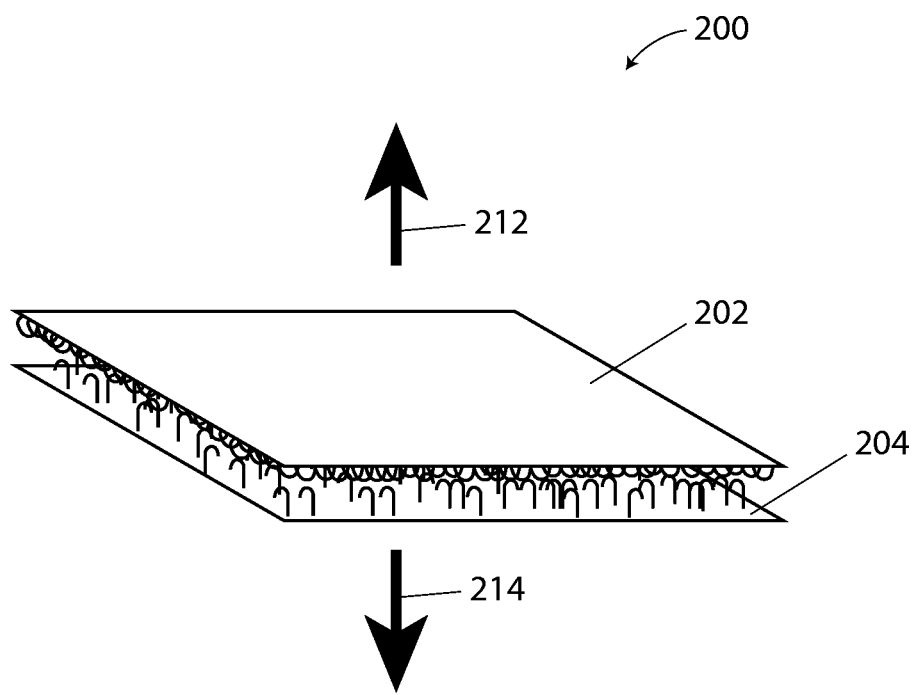
FIG. 2 is a prior art illustrative representation of tension for hook and loop surfaces.

FIG. 2 is a prior art illustrative representation 200 of tension for hook and loop surfaces. In particular, tension may be defined by the tensile strength of hook surface 204 and loop surface 202 measured when the surfaces are overlapped and engaged, then pulled along perpendicular lines 212 and 214, which lines are perpendicular with respect to the engaged plane.

Figure 3:
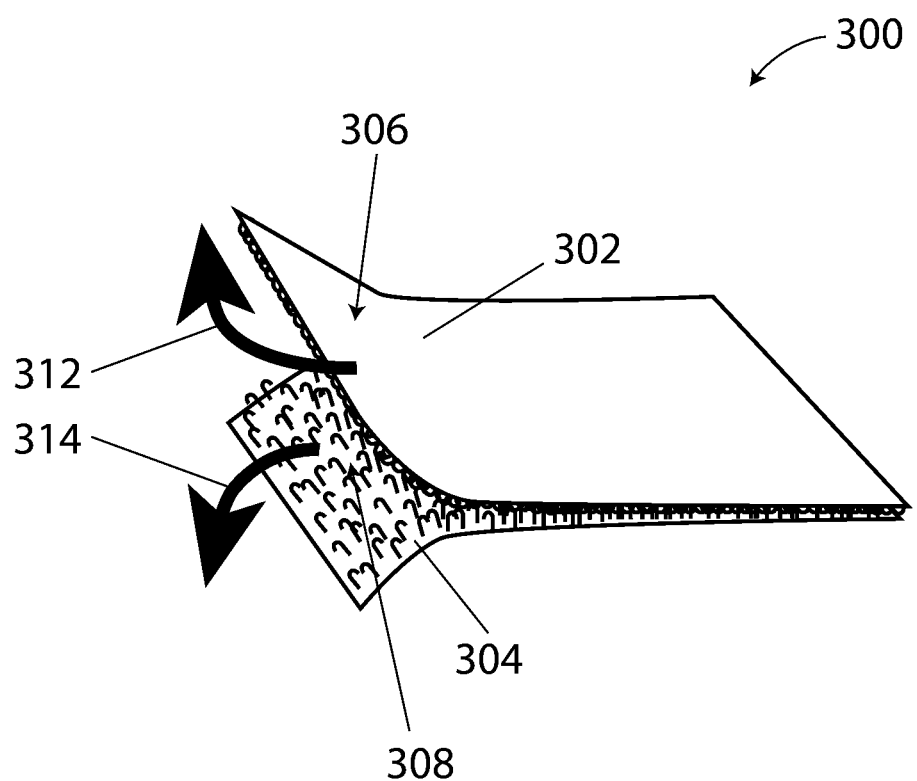
FIG. 3 is a prior art illustrative representation of peel for hook and loop surfaces.

FIG. 3 is a prior art illustrative representation 300 of peel for hook and loop surfaces. In particular, peel may defined by the tensile strength of hook surface 304 and loop surface 302 measured when the surfaces are overlapped and engaged, and pulled along edges 306 and 308 as indicated by lines 312 and 314, which lines are pulled approximately 180 degrees from one another.

Figure 4:
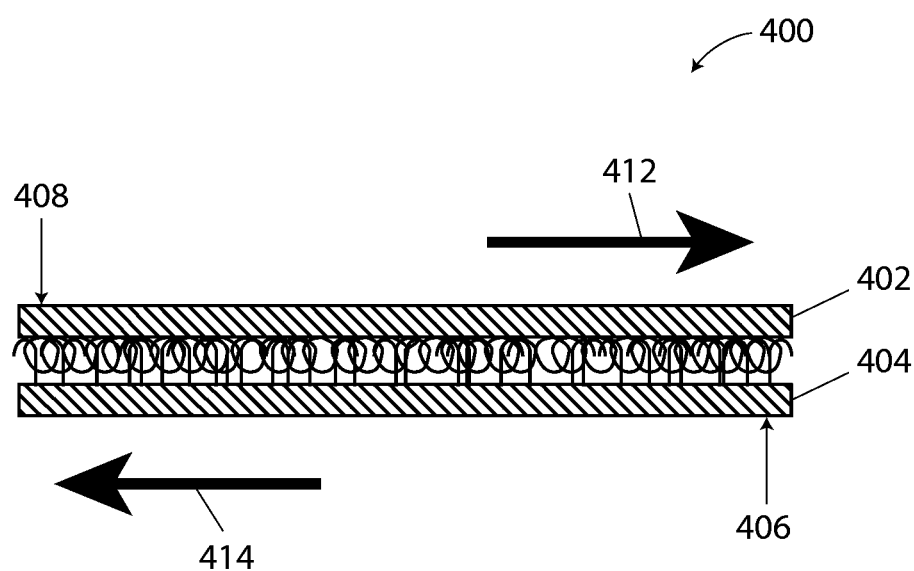
FIG. 4 is a prior art illustrative representation of shear for hook and loop surfaces.
Figure 5:
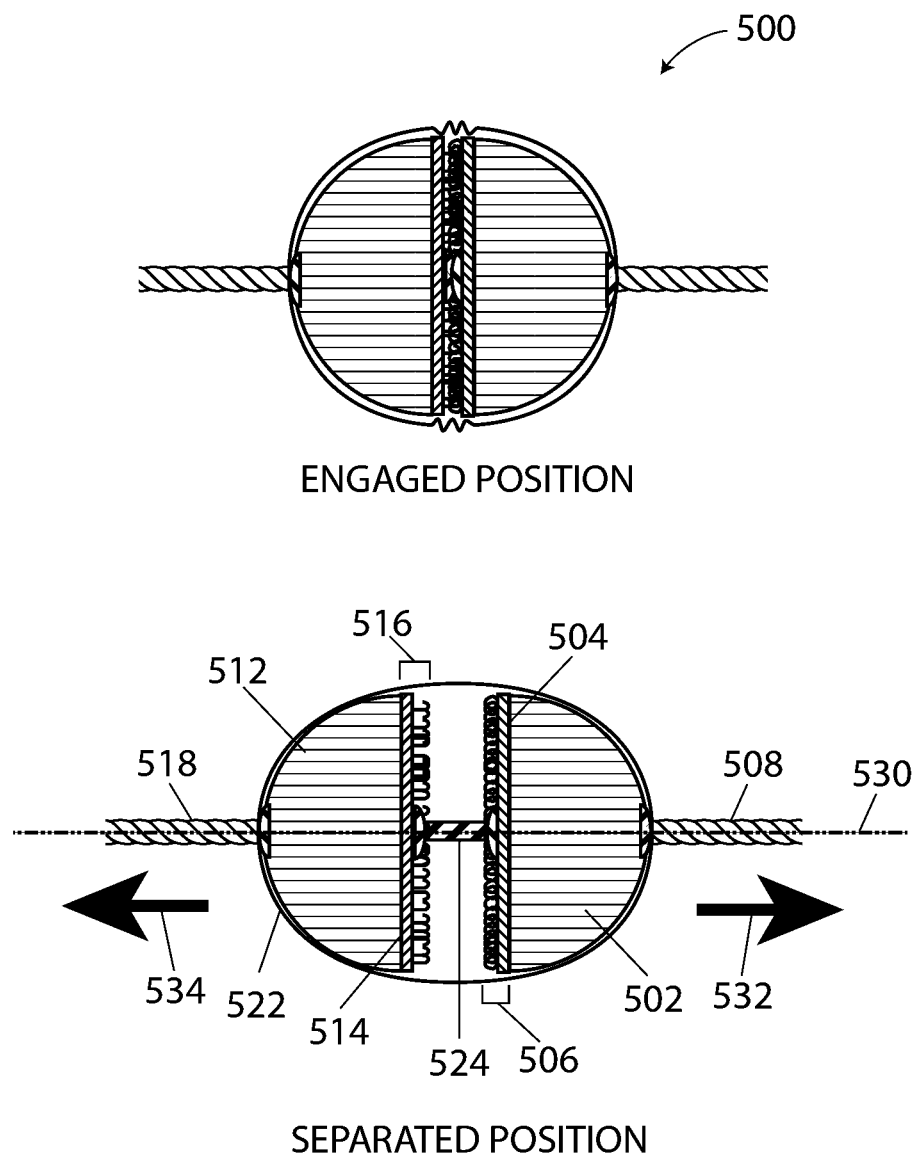
FIG. 5 is an illustrative representation of noise making toy having, a tension release separable and self-returning member embodiment in accordance with embodiments of the present invention.

FIG. 4 is a prior art illustrative representation 400 of shear for hook and loop surfaces, in particular, sheer may defined by the tensile strength of hook surface 404 and loop surface 402 measured when the surfaces are overlapped and engaged, held along opposite ends 406 and 408, and pulled along lines 412 and 414, which lines are approximately 180 degrees front one another FIG. 5 is an illustrative representation of a noise making toy 500 having tension release separable and self-returning member embodiment in accordance with embodiments of the present invention. In particular, FIG. 5 illustrates a noise making toy 500 embodiment in a engaged position and a separated position. As illustrated, noise making toy embodiments include graspable, body element 502, which may be manufactured from any elastic or non-elastic material known in the art, and which materials may be solid, hollow, shredded, spun, or stuffed without limitation, in addition, releasable surface 506 may be affixed along graspable body element surface 504 of graspable body element 502. In addition, graspable body element pull 508 may be positioned opposite releasable surface 506 along the graspable body element surface. In embodiments, graspable body element pulls may include an elastic cord, a non-elastic cord, an elastic rope, a non-elastic rope, an elastic cable, a non-elastic cable, an elastic strap, a non-elastic strap, an elastic ring, and a non-elastic ring without limitation. As illustrated, graspable body element pull 508 may be further attached with enclosure 522.

Further illustrated, noise making toy embodiments include graspable body element 512, which may be manufactured from any elastic or non-elastic material known in the art. As illustrated, releasable surface 516 may be affixed along graspable body element surface 514 of graspable body element 512. Further illustrated, graspable body element pull 518 may be positioned opposite releasable surface 516 along the graspable body element surface. As above, in embodiments, graspable body element pulls may include an elastic cord, a non-elastic cord, an elastic rope, a non-elastic rope, an elastic cable, a non-elastic cable, an elastic strap, a non-elastic strap, an elastic ring, and a non-elastic ring without limitation. As illustrated, graspable body element pull 518 may be further attached with enclosure 522. Return element 524 may be positioned along releasable surfaces 506 and 516 and along axis of pull 530 as defined by graspable body elements 502 and 512. Further, illustrated is enclosure 522 for enclosing graspable body elements 502 and 512.

In order to operate noise making toys from engaged position to separated position, a user may grasp graspable body element pulls 508 and 518 and pull those elements along axis 530 in opposite directions as represented by arrows 532 and 534. As may be appreciated, as releasable surfaces 506 and 516 are separated or partially separated a noise may be emitted, which noise may serve to excite an animal or pet. A user may then release or partially release either of graspable body pull elements 508 or 518 to allow the noise making toy to move to partially or fully return to an engaged position such that releasable surfaces 506 and 516 are reengaged. Return element 524 may be utilized to provide return force to graspable body elements 502 and 512. It may be appreciated that in some embodiments, methods may include: a user playing with a pet or animal where the pet or animal grasps at least one of the graspable body elements; a pet or animal playing alone; or more than one pet or animal playing together. In the illustrated embodiment, releasable surfaces provide a tension release configuration.

Figure 6:
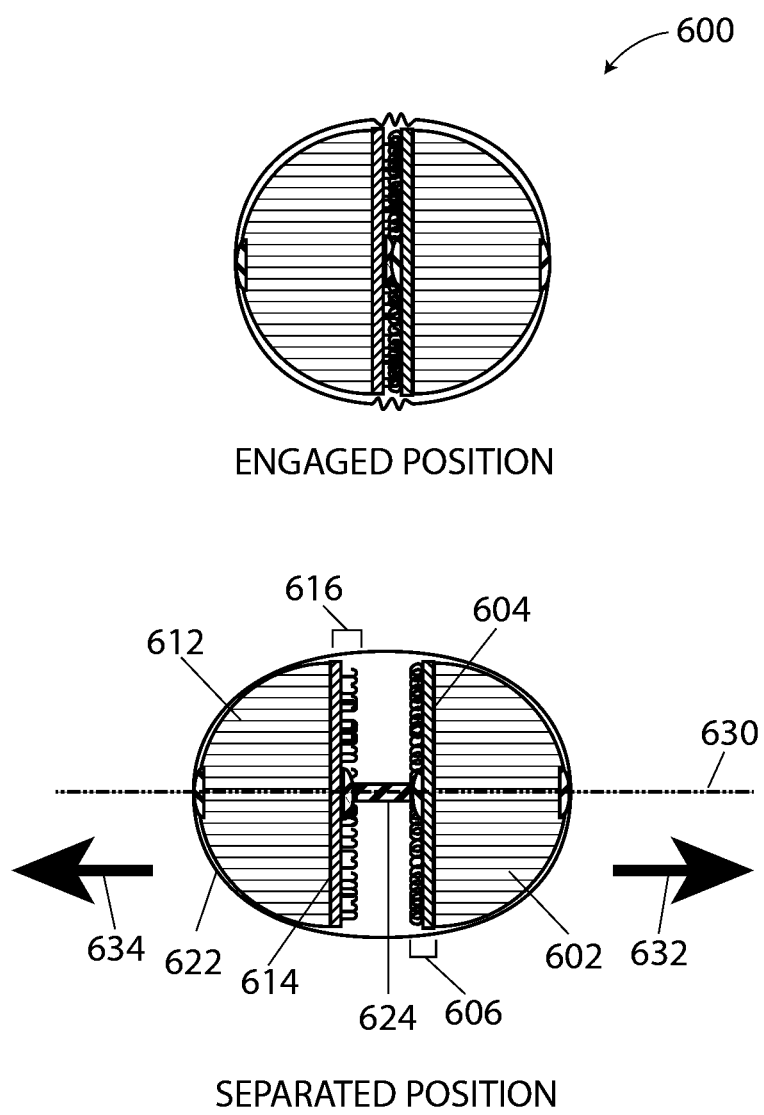
FIG. 6 is an illustrative representation or a noise making toy having a tension release separable and self-returning member embodiment in accordance with embodiments of the present invention.

FIG. 6 is an illustrative representation of a noise making toy 600 having a tension release separable and self-returning member embodiment in accordance with embodiments of the present invention. In particular, FIG. 6 illustrates a noise making toy 600 embodiment in a engaged position and a separated position. As illustrated, noise, making toy embodiments include graspable body element 602, which may be manufactured from any elastic or non-elastic material known in the art. In addition, releasable surface 606 may be affixed along graspable body element surface 604 of graspable body element 602. Further illustrated, noise making toy embodiments include graspable body element 612, which may be manufactured from any elastic or non-elastic material known in the art. In addition, releasable surface 616 may be affixed along graspable body element surface 614 of graspable body element 612. Return element 624 may be positioned along releasable surfaces 606 and 616 and along axis of pull 630 centered along graspable body elements 602 and 612. Further, illustrated is enclosure 622 for enclosing graspable body elements 602 and 612.

In order to operate noise making toys from engaged position 600 to separated position 620, a user may grasp graspable body elements 602 and 612 and pull those elements along axis 630 in opposite directions as represented by arrows 632 and 634. As may be appreciated, as releasable surfaces 606 and 616 are separated or partially separated, a noise may be emitted, which noise may serve to motivate or excite an animal or pet. A user may then release either of graspable body elements 602 and 612 to allow the noise making toy to move to return position 600. Return element 624 is utilized to provide return force to graspable body elements 602 and 612. It may be appreciated that in some embodiments, methods may include: a user playing with a pet or animal where the pet or animal grasps at least one of the graspable body elements; a pet or animal playing alone; or more than one pet or animal playing together. In the illustrated embodiment, releasable surfaces provide a tension release configuration.

Figure 7:
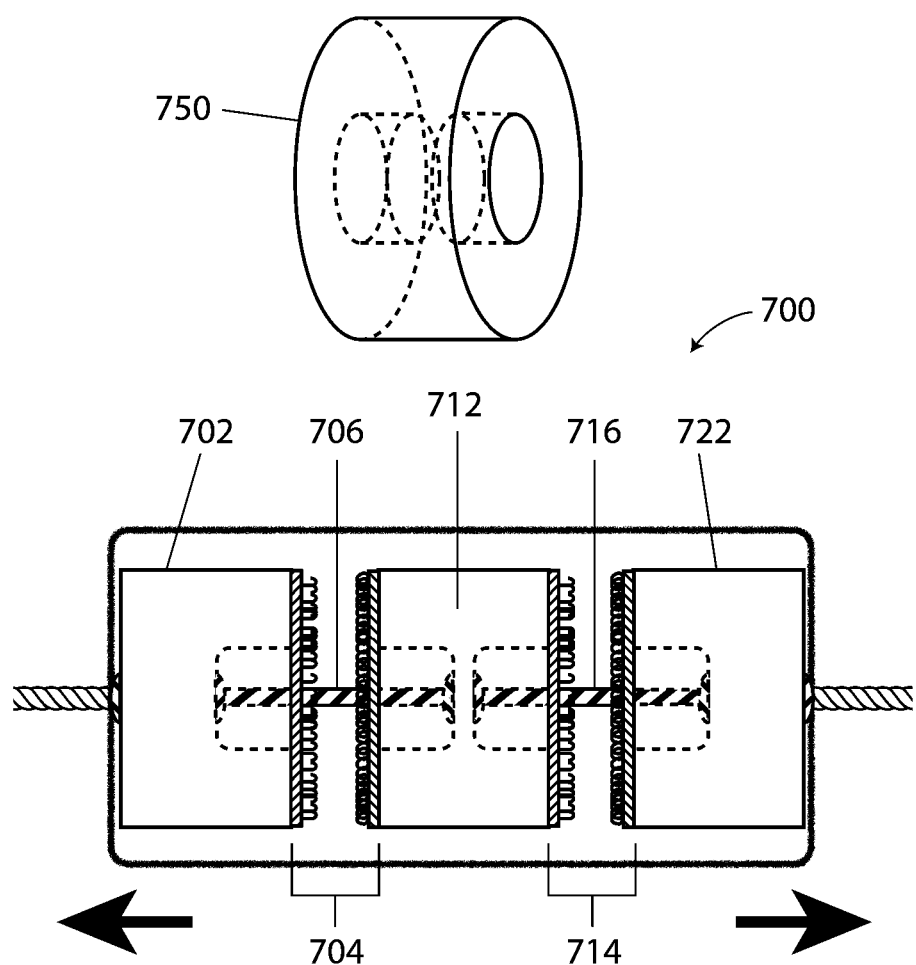
FIG. 7 is an illustrative representation of a noise making, toy having multiple tension release separable and self-returning member embodiment in accordance with embodiments of the present invention.

FIG. 7 is an illustrative representation of a noise making toy 700 having multiple tension release separable and self-returning member embodiment in accordance with embodiments of the present invention. Noise making toy 700 operates in as manner similar to noise making by embodiments provided in FIG. 5. In addition, noise making toy 700 may include any number of separable members 702, 712, and 722. For clarity's sake, a 3-dimensional illustration 750 is provided that represents a separable member. Although a circular separable member is illustrated, any shape may be utilized without departing from embodiments provided herein. Further illustrated, multiple releasable surface pairs 704 and 714 may be utilized in embodiments. Surfaces may provide similar tension materials or dissimilar tension materials without departing from embodiments herein. For example, in embodiments having dissimilar tension materials, separable elements may separate at different rates. Further as illustrated, multiple return/limit elements 706 and 716 may be utilized to provide a return force to separable members, limit separation of separable members, increase resistance to separation of releasable surfaces, or any combination thereof. In the illustrated embodiment, releasable surfaces provide a tension release configuration.

Figure 8:
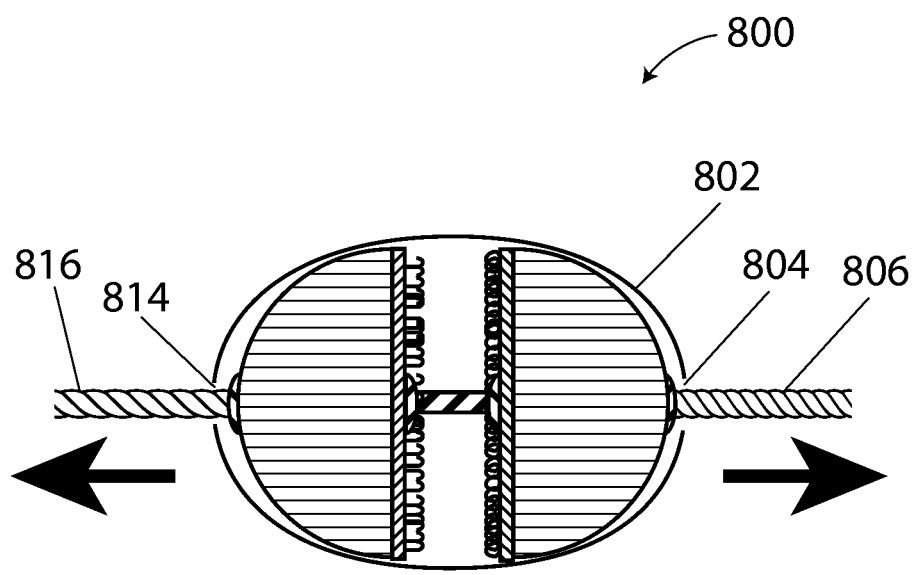
FIG. 8 is an illustrative representation of a noise making toy having a tension release separable and self-returning member embodiment in accordance with embodiments of the present invention.

FIG. 8 is an illustrative representation of noise making toy 800 having a tension release separable and self-returning member embodiment in accordance with embodiments of the present invention. Noise making toy 800 operates in a manner similar to noise making toy embodiments provided in FIG. 5. In addition, noise making toy 800 includes enclosure 802 that includes pull openings 804 and 814 such that graspable body element pulls 608 and 816 may freely pass through enclosure 802. In the illustrated embodiment, releasable surfaces provide a tension release configuration.

Figure 9:
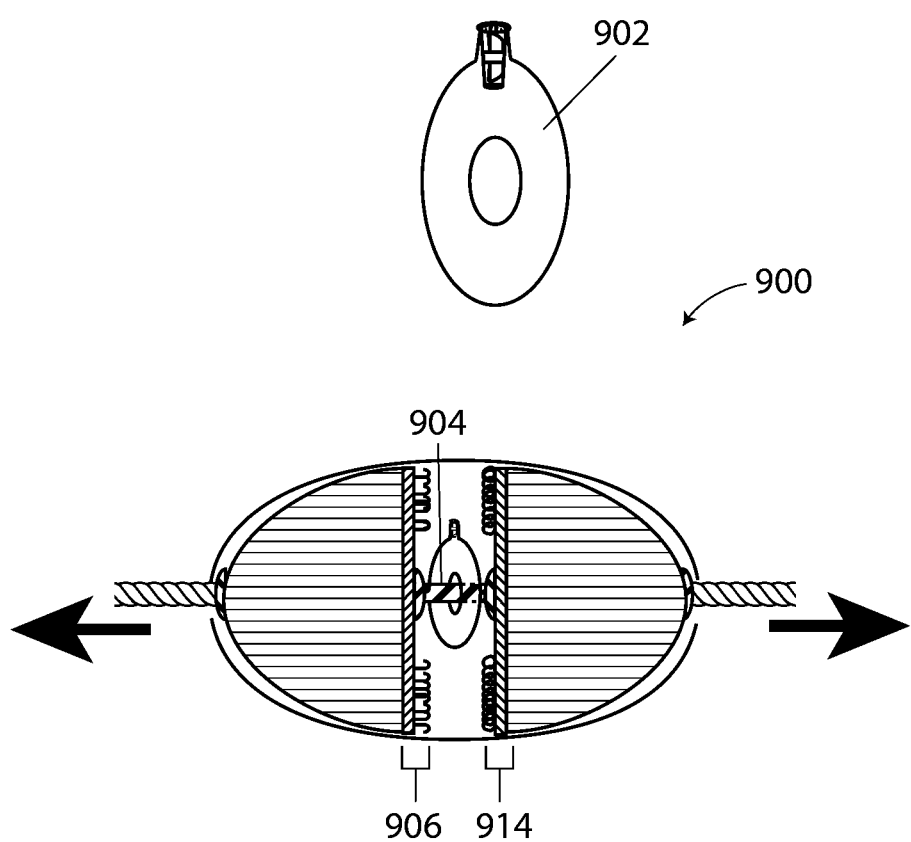
FIG. 9 is an illustrative representation of a noise making toy having a tension release separable and self-returning member and squeaker element embodiment in accordance with embodiments of the present invention.

FIG. 9 is an illustrative representation of a noise making toy 900 having a tension release separable and self-returning, member and squeaker element 902 embodiment in accordance with embodiments of the present invention. Noise making toy 900 operates in a manner similar to noise making toy embodiments provided in FIG. 5. In addition, squeaker element 902 may be provided that emits additional sounds to motivate or excite an animal or pet. As illustrated, squeaker element 902 may be disposed along return element 904 and may be configured to emit a sound when releasable surfaces 916 and 916 release or engage. It may be appreciated that in embodiments, squeaker elements may be disposed in any manner known in the art that provides a sound emission when releasable surfaces release, engage, or any combination thereof it may be further appreciated that squeaker embodiments may be provided having any suitable shape or configuration without limitation. In the illustrated embodiment, releasable surfaces provide a tension release configuration.

Figure 10:
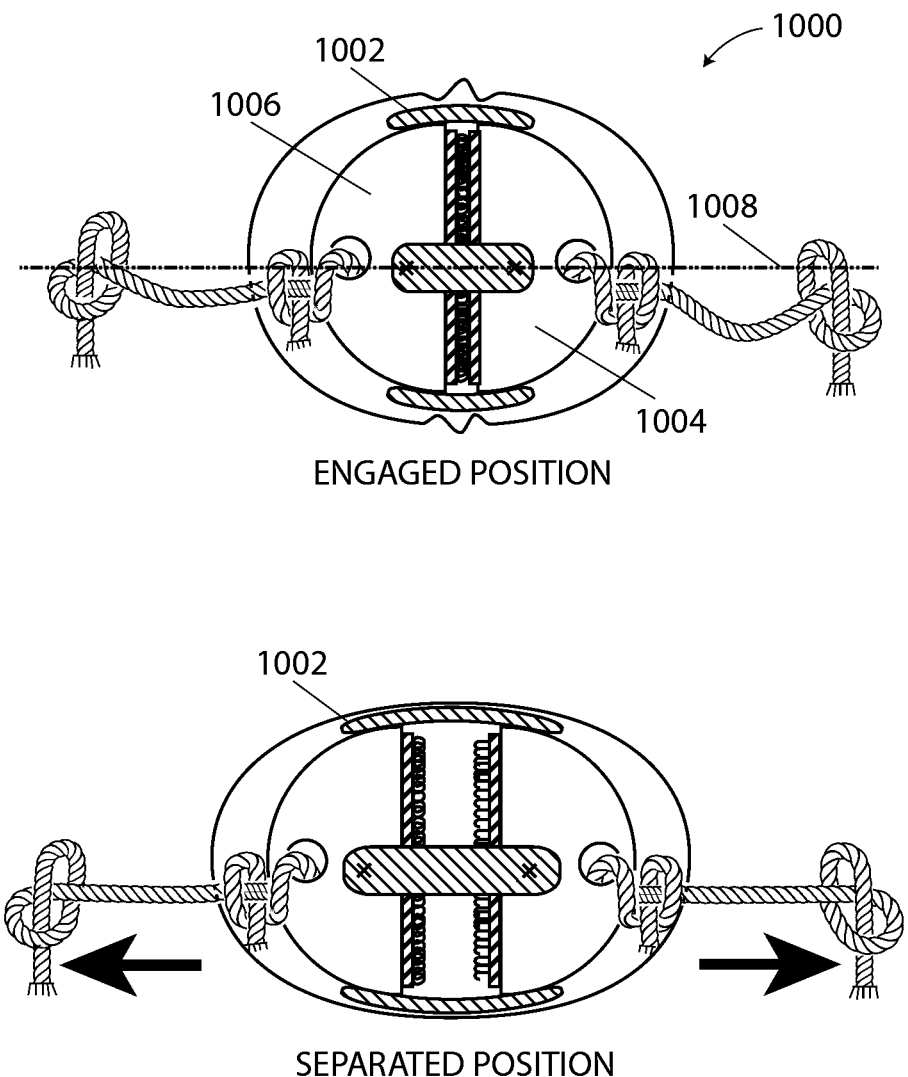
FIG. 10 is an illustrative representation of a noise making toy having a tension release separable and self-returning member and travel limiting element embodiment in accordance with embodiments of the present invention.

FIG. 10 is an illustrative representation of a noise making toy 1000 having a tension release separable and self-returning member and travel limiting element embodiment in accordance with embodiments of the present invention. Noise making toy 1000 operates in a manner similar to noise making toy embodiments provided in FIG. 5. In addition, travel limiting element 1002 is disposed along graspable body elements 1004 and 1006 and configured to limit separation between graspable body element 1004 and 1006 along an axis of pull 1008 as indicated by engaged position and separated position. In some embodiments, travel limiting element 1002 may be further configured as a return element disposed along graspable body elements 1004 and 1006. It may be appreciated that travel limiting elements and return elements may be used in any combination without departing from present embodiments. In the illustrated embodiment, releasable surfaces provide a tension release configuration.

Figure 11:
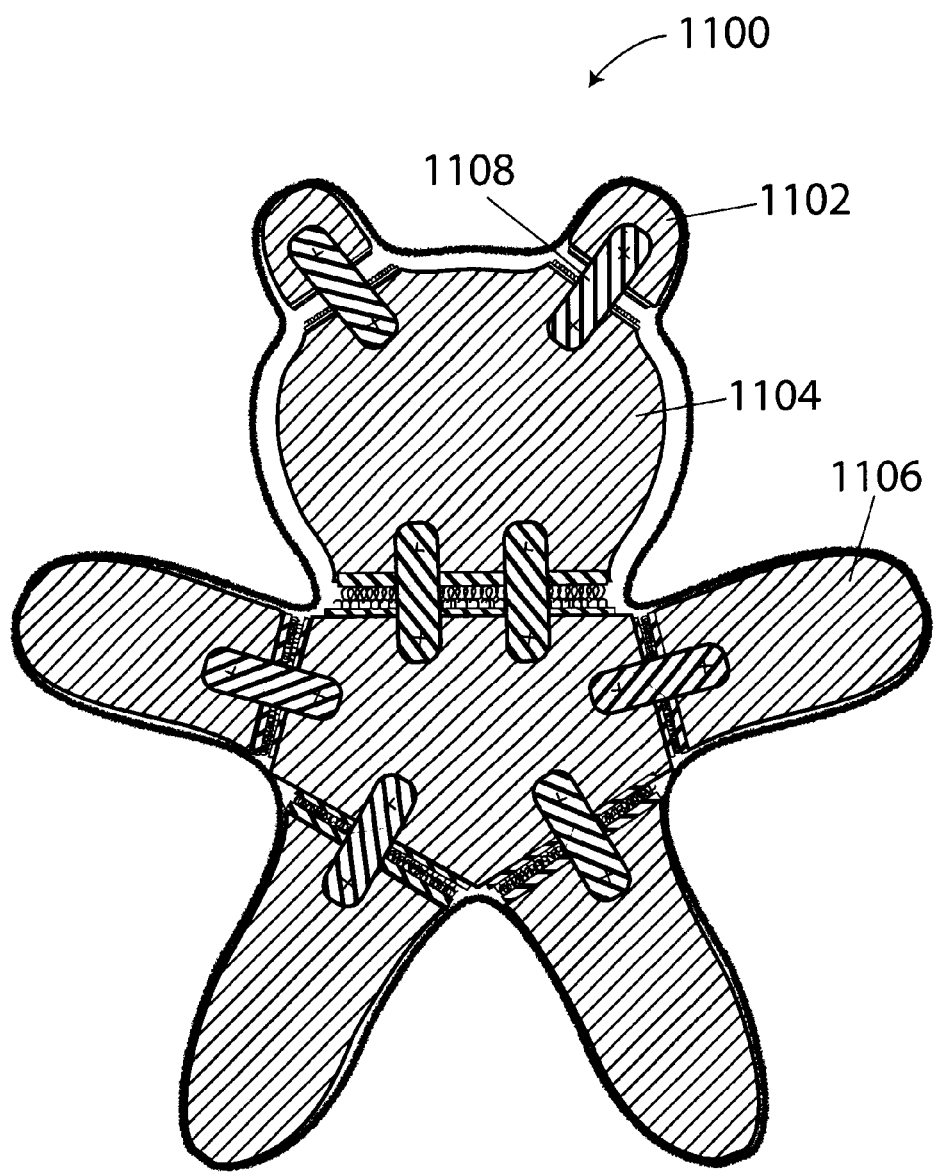
FIG. 11 is an illustrative representation of a noise making plush toy having multiple tension release separable and self-returning member embodiment in accordance with embodiments of the present invention.

FIG. 11 is an illustrative representation of a noise making plush toy 1100 having multiple tension release separable and self-returning member embodiment in accordance with embodiments of the present invention. Noise making plush toy 1100 operates in a manner similar to noise making toy embodiments provided in FIG. 5. In addition, any number of graspable body elements (for example 1102, 1104, and 1106) may be utilized separately or in combination in any manner without departing from embodiments provided herein. Further, return or travel limit element 1108 may be utilized in combination with graspable body elements. In some embodiments, plush toy cover 1110 may provide travel limit and/or return functionality. Although a toy bear shape is illustrated, it may be appreciated that any shape or form may be utilized without departing from embodiments provided herein. In the illustrated embodiment, releasable surfaces provide a tension release configuration.

Figure 12:
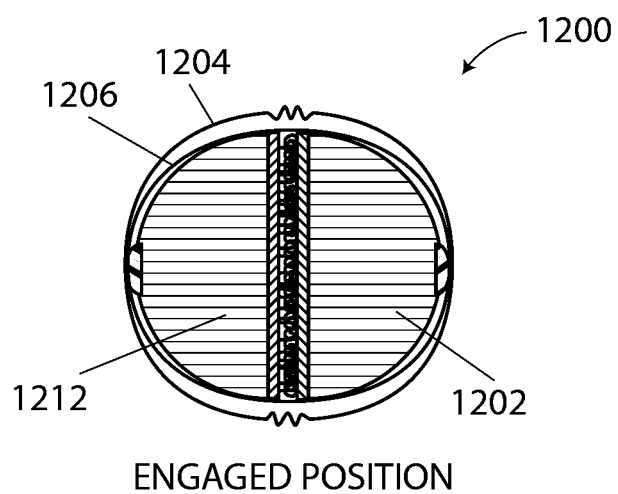
FIG. 12 is an illustrative representation of a noise making toy having a tension release separable and self-returning member embodiment in accordance with embodiments of the present invention.
Figure 12:
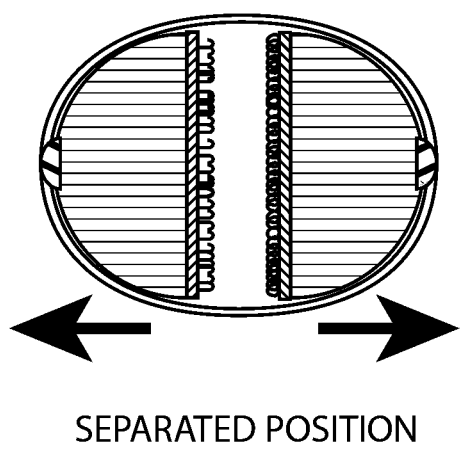

FIG. 12 is an illustrative representation of a noise making toy 1200 having a tension release separable and self-returning member embodiment in accordance with embodiments of the present invention. In particular, FIG. 12 illustrates a noise making toy embodiment in an engaged position and a separated positions illustrated, noise making toy embodiments include graspable body elements 1202 and 1212 which may be manufactured from any elastic or non-elastic material known in the art. Further illustrated is stretchable enclosure 1206 for enclosing graspable body elements 1202 and 1212. Stretchable enclosure 1206 may be configured to return graspable body elements 1202 and 1212 to an engaged position. Stretchable enclosures may be manufactured from any material known in the art without departing from embodiments provided herein. Still further, illustrated is enclosure 1204 for enclosing graspable body elements 1202 and 1212 as well as stretchable enclosure 1206. In the illustrated embodiment, releasable surfaces provide a tension release configuration.

Figure 13:
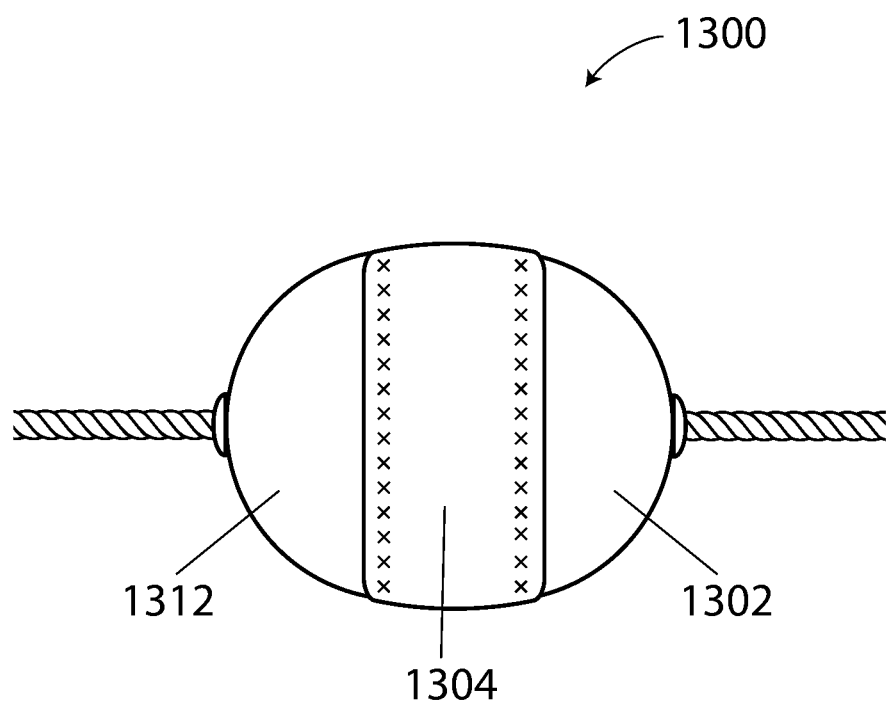
FIG. 13 is an illustrative representation of a noise making toy having tension release separable and self-returning member embodiment in accordance with embodiments of the present invention.

FIG. 13 is an illustrative representation of a noise making toy 1300 having tension release separable and self-returning member embodiment in accordance with embodiments of the present invention. Noise making plush toy 1300 operates in a manner similar to noise making, toy embodiments provided in FIGS. 5 and 10. In addition, return/limit element 1304 may enclose releasable surfaces of graspable body elements 1302 and 1312. In the illustrated embodiment, releasable surfaces provide a tension release configuration.

Figure 14:
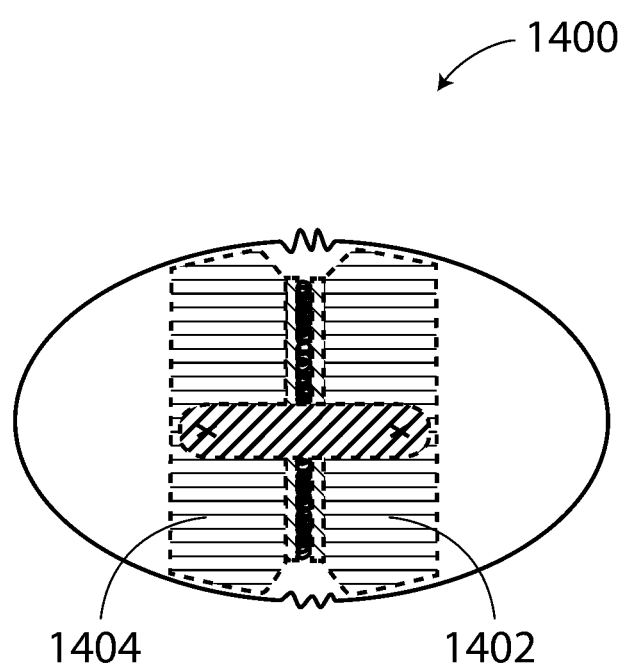
FIG. 14 is an illustrative representation of a noise making toy having tension release separable and self-returning member embodiment in accordance with embodiments of the present invention.

FIG. 14 is an illustrative representation of a noise making toy 1400 having tension release separable and self-returning member embodiment in accordance with embodiments of the present invention. Noise making plush toy 1400 operates in a manner similar to noise making toy embodiments provided in FIGS. 5 and 10. In addition, end caps 1402 and 1404 are provided that each open on outward facing sides from additional fabric and hook and loop materials. In the illustrated embodiment, releasable surfaces provide a tension release configuration.

Figure 15:
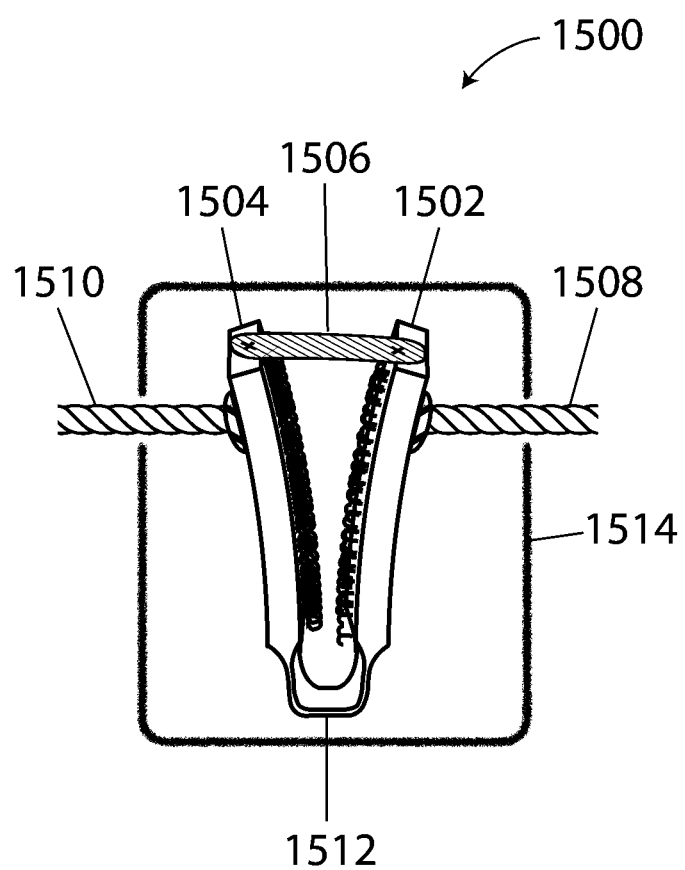
FIG. 15 is an illustrative representation of a noise making toy having peel release separable and self-returning member embodiment in accordance with embodiments of the present invention.

FIG. 15 is an illustrative representation of a noise making toy 1500 having peel release separable and self-returning member embodiment in accordance with embodiments of the present invention. As illustrated, releasable surfaces 1502 and 1504 may be mechanically coupled by hinge or at hinge point 1512. Releasable surfaces 1502 and 1504 may be further coupled with pulls 1508 and 1510. As may be seen, when pulls 1508 and 1510 are pulled, releasable surfaces 1502 and 1504 are peel released thereby emitting a more or less continuous noise. Further illustrated, return/limit element 1506 may be utilized to return releasable surfaces to an engaged position or limit travel of releasable surfaces or both. Still further, enclosure 1514 may be utilized in some embodiments to protect releasable surfaces and associated elements. In the illustrated embodiment, releasable surfaces provide a peel release configuration.

Figure 16:
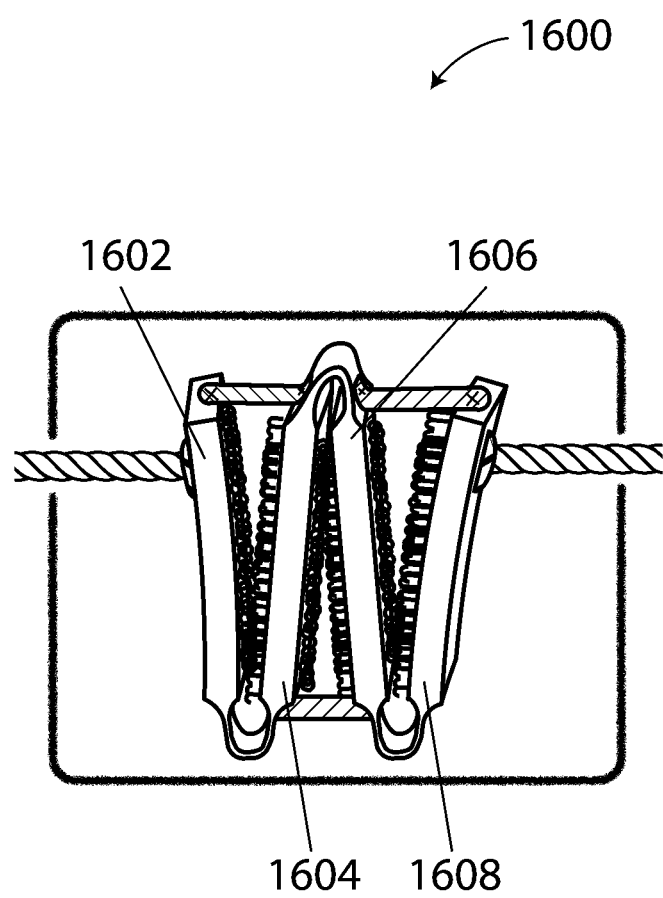
FIG. 16 is an illustrative representation of a noise making toy having peel release and separable multiple self-returning members embodiment in accordance with embodiments of the present invention.

FIG. 16 is an illustrative representation of a noise making toy 1600 having peel release and separable multiple self-returning members embodiment in accordance with embodiments of the present invention. Noise making toy 1600 operates in a manner similar to noise making toy embodiments provided in FIG. 15. In addition, multiple release surfaces 1602, 1604, 1606, and 1608 may be utilized in combination. In some embodiments, each paired releasable surface has the same pull strength. In other embodiments, each paired releasable surface has different pull strength without limitation. In the illustrated embodiment, releasable surfaces provide a peel release configuration.

Figure 17:
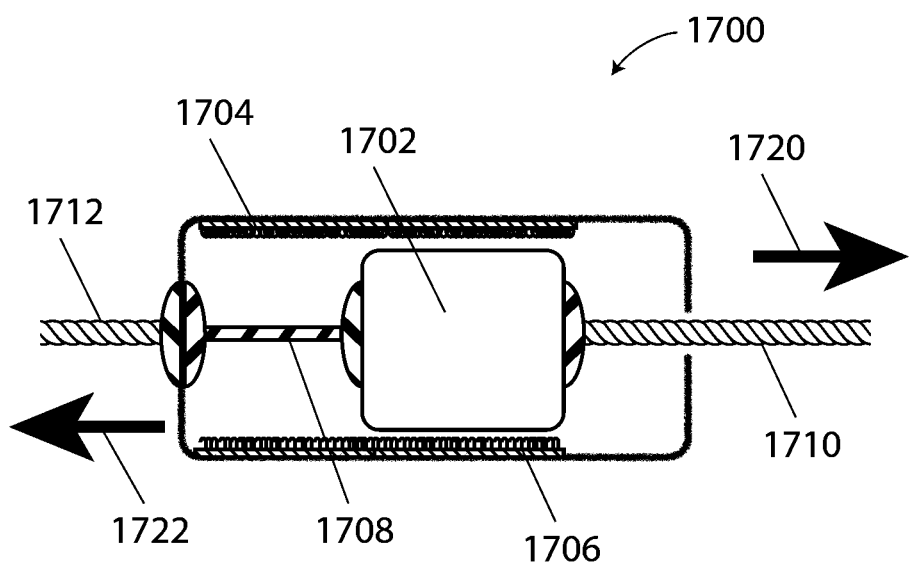
FIG. 17 is an illustrative representation of a noise making to having shear release and separable multiple self-returning members embodiment in accordance with embodiments of the present invention.

FIG. 17 is an illustrative representation of a noise making toy 1700 having unidirectional shear release and separable multiple self-returning members embodiment in accordance with embodiments of the present invention. In particular, shear member 1702 may be in unidirectional shear release contact with releasable surfaces 1704 and 1706. In this configuration, shear member 1702 is releasably held by releasable surfaces 1704 and 1706 in one direction of pull 1720, while being freely returnable in another direction of pull 1722. Pulls 1710 and 1712 may be utilized to pull shear member along releasable surfaces. Return/limit element 1708 may be utilized to return shear member to an engaged position or limit travel of shear member or both without limitation. In some embodiments, releasable surfaces 1704 and 1706 may release shear member prior to travel limit. In these embodiments, a sudden release may be optionally provided. In the illustrated embodiment, releasable surfaces provide a shear release, configuration.

Figure 18:
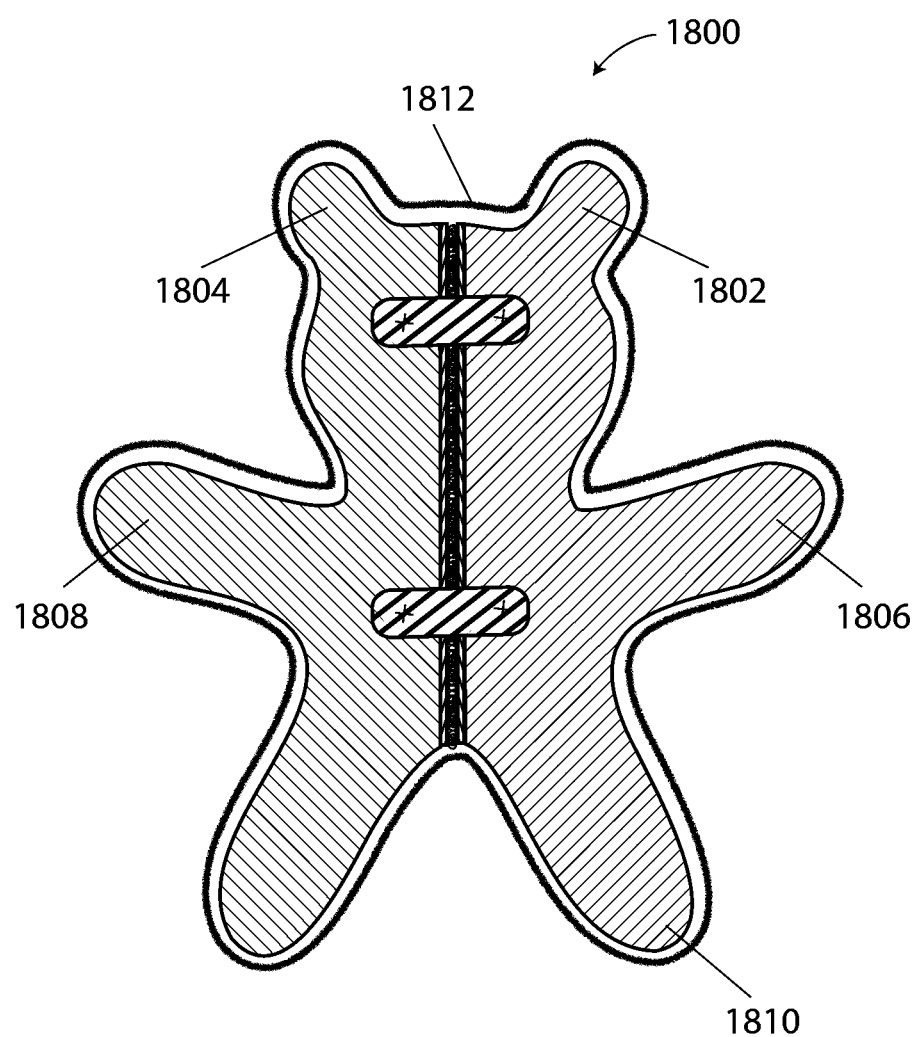
FIG. 18 is an illustrative representation of a noise making toy having selective release and separable multiple self-returning members embodiment in accordance with embodiments of the present invention.

FIG. 18 is an illustrative representation of a noise making toy 1800 having selective release and separable multiple self-returning members embodiment in accordance with embodiments of the present invention. It may be desirable, in some embodiments to provide releasable surfaces that ma be released in a variety of ways both to emit a different sound and to change the strength of release. For example, as illustrated, releasable surfaces 1812 may be positioned along a vertical orientation of noise making toy 1800. Noise making toy may be selectively grasped at graspable members 1802, 1804, 1806, 1808, and 1810. By grasping along different graspable members, releasable surfaces may be selectively released. For example, when grasping and pulling along graspable surfaces 1802 and 1804, a peel release may be provided. In addition, when grasping and pulling along graspable surfaces 1806 and 1808, a tension release may be provided. Furthermore, when grasping and pulling along graspable surfaces 1804 and 1810, a shear release may be provided. Having a variety of grasping points corresponding with varied surface releases may provide additional variety for an animal or pet.

Figure 19:
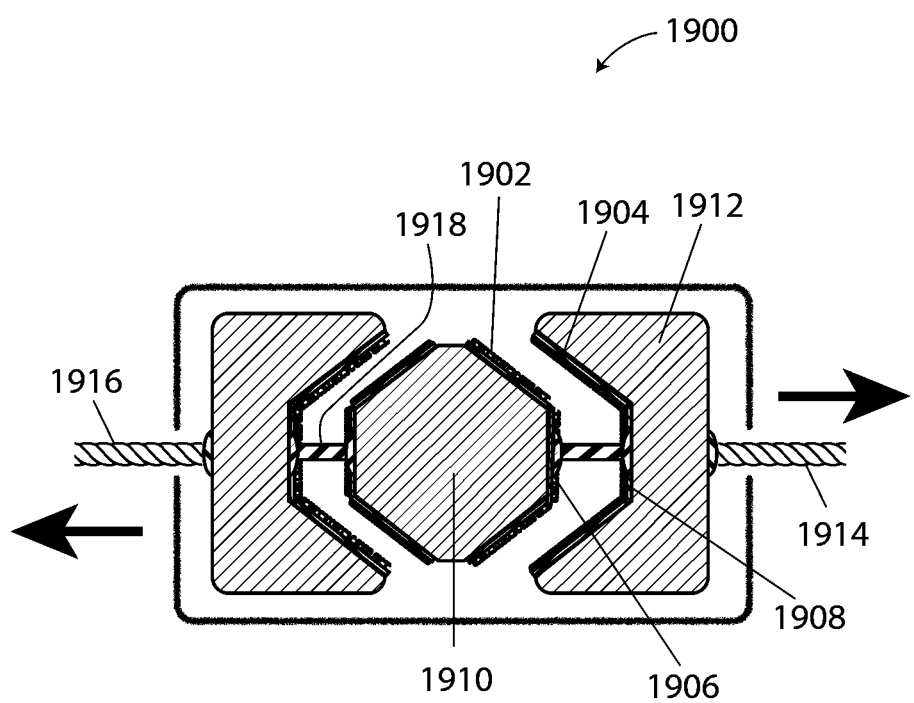
FIG. 19 is an illustrative representation of a noise making to having mixed release and separable multiple self-returning members embodiment in accordance with embodiments of the present invention.

FIG. 19 is an illustrative representation of a noise making toy 1900 having mixed release and separable multiple self-returning members embodiment in accordance with embodiments of the present invention. In particular, releasable surfaces 1902 and 1904 may provide a shear release when members 1910 and 1912 are separated by pulling on pulls 1914 and 1916. In addition, releasable surfaces 1906 and 1908 may provide a tension release when members 1910 and 1912 are separated by pulling on pulls 1914 and 1916. Return/limit element 1918 may be utilized to return members to an engaged position or limit travel of members or both without limitation. Having a variety of surface releases may provide additional variety for an animal or pet.

While this invention has been described in terms of several embodiments there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations permutations, and equivalents as fall within the true spirit and scope of the present invention.

What is claimed is:

1. A noise making toy comprising:
   a first graspable body element;
   a first releasable surface affixed along a first graspable body element surface of the first graspable body element;
   a second graspable body element;
   a second releasable surface affixed along a second graspable body element surface of the second graspable body element, wherein the second releasable surface is configured and positioned for releasably engaging the first releasable surface;
   an enclosure for enclosing the first graspable body element and the second graspable body element;
   a return element affixed to the first graspable body element and the second graspable body element, wherein the return element is positioned along the first releasable surface and the second releasable surface, and wherein the return element is further positioned along an axis of pull centered along the first graspable body element and the second graspable body element
   a first graspable body element pull positioned opposite the first releasable surface along the first graspable body element surface; and
   a second graspable body element pull positioned opposite the second releasable surface along the first graspable body element surface,
      wherein the enclosure includes at least one pull opening each for the first graspable body element pull and the second graspable body element pull, and
      wherein the return element is further positioned along the axis of pull defined by the first graspable body element and the second graspable body element.

2. The noise making toy of claim 1, wherein the first and second graspable body element pulls are selected from the group consisting of: an elastic cord, a non-elastic cord, an elastic rope, a non-elastic rope, an elastic cable, a non-elastic cable, an elastic strap, a non-elastic strap, an elastic ring, and a non-elastic ring.

3. The noise making toy of claim 1, further comprising:
   a first pull tab mechanically coupled along the first graspable body element surface and positioned opposite the first releasable surface, wherein the first pull tab is configured to receive the first graspable body element; and
   a second pull tab mechanically coupled along the second graspable body element surface and positioned opposite the second releasable surface, wherein the second pull tab is configured to receive the second graspable body element.

4. The noise making toy of claim 1 further comprising:
   a plurality of travel limiting members disposed along the first and second graspable body elements and configured to limit separation between the first and second graspable body elements along the pull axis.

5. The noise making toy of claim 4, wherein the plurality of limiting members is manufactured from a material selected from the group consisting of: an elastic polymeric material, a semi-elastic polymeric material, a rigid polymeric material, and a natural fiber.

6. The noise making toy of claim 1 further comprising:
   a squeaker element disposed between the first and second releasable surfaces, wherein the squeaker element is configured to emit a sound the first and second releasable surfaces release.

7. The noise making toy of claim 1 further comprising:
a squeaker element disposed between the first and second releasable surfaces, wherein the squeaker element is configured to emit a sound the first and second releasable surfaces engage.

8. A noise making toy comprising:
a first graspable body element;
a first releasable surface affixed along a first graspable body element surface of the first graspable body element;
a second graspable body element;
a second releasable surface affixed along a second graspable body element surface of the second graspable body element, wherein the second releasable surface is configured and positioned for releasably engaging the first releasable surface;
an enclosure for enclosing the first graspable body element and the second graspable body element;
a plurality of return elements disposed along the first graspable body element and the second graspable body element, wherein the plurality of return elements are positioned along a first edge of the first releasable surface and a second edge of the second releasable surface;
a first graspable body element pull positioned opposite the first releasable surface along the first graspable body element surface; and
a second graspable body element pull positioned opposite the second releasable surface along the first graspable body element surface,
wherein the enclosure includes at least one pull opening each for the first graspable body element pull and the second graspable body element pull, and
wherein the return element is further positioned along the axis of pull defined by the first graspable body element and the second graspable body element.

9. A noise making toy comprising:
a first graspable body element;
a first releasable surface affixed along a first graspable body element surface of the first graspable body element;
a second graspable body element;
a second releasable surface affixed along a second graspable body element surface of the second graspable body element, wherein the second releasable surface is configured and positioned for releasably engaging the first releasable surface;
a stretchable enclosure for enclosing the first graspable body element, the second graspable body element, and the stretchable enclosure, wherein the stretchable enclosure is configured for returning the first graspable body element and the second graspable body element to an engaged position; and
an enclosure for enclosing the first graspable body element, the second graspable body element, and the stretchable enclosure.

10. The noise making toy of claim 9, wherein
the first graspable body element further comprises a first plurality of graspable members, and wherein
the second graspable body element further comprises a second plurality of graspable members such that pulling between the first plurality of graspable members and the second plurality of graspable members provides one of a tension release, a shear release, or a peel release between the first releasable surface and the second releasable surface.

11. A method for using a noise making toy comprising:
providing the noise making toy, wherein the noise making toy includes,
a first graspable body element,
a first releasable surface affixed along a first graspable body element surface of the first graspable body element,
a second graspable body element,
a second releasable surface affixed along a second graspable body element surface of the second graspable body element, wherein the second releasable surface is configured and positioned for releasably engaging the first releasable surface,
an enclosure for enclosing the first graspable body element and the second graspable body element, and
a return element affixed to the first graspable body element and the second graspable body element, wherein the return element is positioned along the first releasable surface and the second releasable surface, and wherein the return element is further positioned along an axis of pull centered along the first graspable body element and the second graspable body element;
grasping each of the first and second graspable body elements;
pulling each of the first and the second graspable body elements apart along the axis of pull wherein a noise is emitted when the first and second releasable surfaces are at least partially separated; and
releasing at least one of the first and second graspable body elements such that the first and second releasable surfaces are reengaged.

12. The method of claim 11, further comprising:
grasping a first graspable body element pull positioned opposite the first releasable surface along the first graspable body element surface;
grasping a second graspable body element pull positioned opposite the second releasable surface along the first graspable body element surface; and
pulling the first and second graspable body elements apart along the axis of pull,
wherein the enclosure includes at least one pull opening each for the first graspable body element pull and the second graspable body element pull, and
wherein the return element is further positioned along the axis of pull defined by the first graspable body element and the second graspable body element.

13. The method of claim 12, wherein the first and second graspable body element pulls are selected from the group consisting of: an elastic cord, a non-elastic cord, an elastic rope, a non-elastic rope, an elastic cable, a non-elastic cable, an elastic strap, a non-elastic strap, an elastic ring, and a non-elastic ring.

14. The method claim 12, wherein the noise making toy further comprises:
a first pull tab mechanically coupled along the first graspable body element surface and positioned opposite the first releasable surface, wherein the first pull tab is configured to receive the first graspable body element; and
a second pull tab mechanically coupled along the second graspable body element surface and positioned opposite the second releasable surface, wherein the second pull tab is configured to receive the second graspable body element.

15. The method of claim 11 wherein the noise making toy further comprises:
a plurality of limiting members disposed along the first and second graspable body elements and positioned to limit separation between the first and second graspable body elements along the pull axis.

16. The method of claim 15, wherein the plurality of limiting members is manufactured from a material selected from the group consisting of: an elastic polymeric material, a semi-elastic polymeric material, a rigid polymeric material, and a natural fiber.

17. The method of claim 11 wherein the noise making toy further comprises:
   a squeaker element disposed between the first and second releasable surfaces, wherein the squeaker element is configured to emit a sound when the first and second releasable surfaces release.

18. The method of claim 11 wherein the noise making toy further comprises:
   a squeaker element disposed between the first and second releasable surfaces, wherein the squeaker element is configured to emit a sound when the first and second releasable surfaces engage.

* * * * *